UNITED STATES PATENT OFFICE.

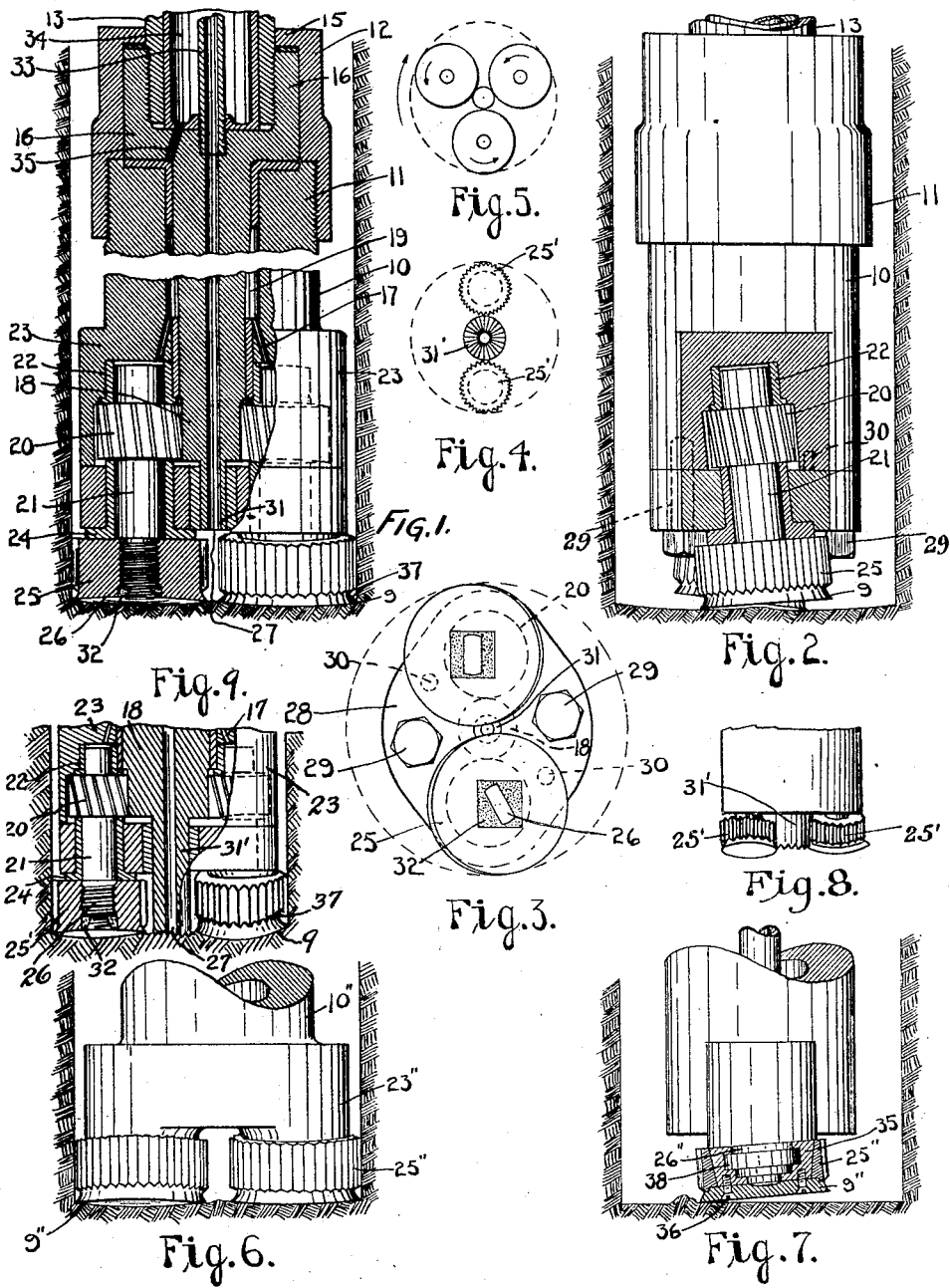

FRANK L. O. WADSWORTH, OF PITTSBURGH, PENNSYLVANIA, ASSIGNOR TO HUGHES TOOL COMPANY, OF HOUSTON, TEXAS, A CORPORATION OF TEXAS.

ROTARY BORING DRILL.

1,417,363.     Specification of Letters Patent.      Patented May 23, 1922.

Original application filed February 6, 1918, Serial No. 215,589. Divided and this application filed April 10, 1920. Serial No. 372,885.

*To all whom it may concern:*

Be it known that I, FRANK L. O. WADSWORTH, a citizen of the United States, residing at Pittsburgh, Pennsylvania, have invented a certain new and useful Improvement in Rotary Boring Drills, of which the following is a full, clear, and exact description, such as will enable others skilled in the art to which it appertains to make and use the same.

My invention relates to rotary boring drills of the type described in my copending application Ser. No. 215589, from which this application has been divided, said application having eventuated into Patent No. 1,338,601, issued April 27, 1920. This type of drill is adapted to bore vertical, horizontal or inclined holes—for oil, or gas, or water wells or for tunneling or mining, or exploring purposes—by the rotary action of disc shaped cutters that are synchronously actuated by a hollow rotating drill stem. The material cut away and disintegrated by the drill is washed away from the cutting members and carried to the upper end of the hole by a stream of flushing water introduced under pressure through the hollow drill stem and through channels in the drill head secured thereto.

My invention particularly relates to a new type of rotary disc bit in which the disc members are rotatably mounted upon axes which are substantially, or nearly, parallel to the axis of rotation of the drill head, as distinguished from the ordinary type of disc bit in which the disc members are mounted on axes transverse to the said axis of rotation; and one of the primary objects of my invention is to produce a disc bit structure which will form a bore hole with a substantially flat bottom, instead of one with a semi-spherical or cup-shaped bottom.

Another object of my invention is to provide rotating disc members of such form and arrangement as to remove the material from the flat bottom of the hole by the shearing action of sharp lower edges on the said members; simultaneously smooth and finish the sides of the hole to the desired diameter by the reaming action of suitably shaped peripheral edges or faces on the rotating discs; and concurrently disintegrate and pulverize any large particles of the excavated material by a crushing and milling action of the lower and edge faces of the cutting and reaming elements.

Another object of my improved construction is to provide disc members, whose cutting and reaming edges will effectively resist wear, and will, therefore, maintain the gauge of the hole for long continued periods of operation.

Another object is to provide a method of operation of the cutting elements whereby the same may be given a rotary motion by imparting thereto a positive rotary movement, directly from the drill stem.

Another object is to produce a simple, strong and durable rotary bit that will be well adapted to drill holes in widely different characters of both soft and hard formations without any change of the cutting elements; and which will automatically adjust its rate of feeding and cutting action in accordance with the resistance of the material being operated upon. Further objects and advantages of the various forms and embodiments of my invention, that are herein shown, will be apparent to those skilled in the art from the more extended description which follows.

Referring to the drawing forming a part of this specification, and wherein like numerals have been used to indicate corresponding parts in each of the several views: Fig. 1 is a side view partly in section on a central longitudinal plane of the bit; Fig. 2 is a side elevation taken at right angles to the position illustrated in Fig. 1, the lower part of the head being cut away along the central plane of the cutter shaft to show the forward inclination of the cutter; Fig. 3 is a bottom plan view of the same; Figs. 4 and 5 are similar views of other forms of this device; Fig. 6 shows another embodiment of my invention; Fig. 7 is a view of the embodiment illustrated in Fig. 6, taken at right angles to the position therein shown, the cutting elements being shown in central longitudinal section; Fig. 8 is a side elevation of the form of device shown in Fig. 4, and Fig. 9 is a central longitudinal section through the embodiment of my invention shown in Fig. 8, part of the tool being shown in elevation.

In the embodiment illustrated in Figs. 1 to 3 inclusive, the numeral 10 indicates the drill head which is threaded at its upper end 11 for attachment to a collar 12. The drill head is not secured directly to the lower end of the drill stem collar 16, but is constructed to rotate about said collar. The collar 16 is threaded interiorly for attachment to the drill stem 13. The drill head 10 is adapted to be held against longitudinal movement by an inwardly projecting flange 15 upon the collar 12 to which it is secured. The drill stem collar 16 is extended downwardly to the lower end of the drill head, and is provided near its lower end with a spur gear 18 that engages with cross spur gears 20 that are secured on the cutter shafts 21. The lower end of each of the cutter shafts 21 is reduced in diameter and threaded at 26 for attachment to the horizontal cutting member 25. These cutters are mounted upon the shaft supports 21, which are inclined forwardly in the direction of rotation of the head. The head is designed to revolve in a clock-wise direction —as seen from above—and the shaft supports of the disc members, are inclined forwardly, as previously indicated, so as to bring the lower front edges of the disc members 25 into cutting engagement with the material at the bottom of the bore hole, as shown in Fig. 2. The outer portions of the periphery of these discs are in substantial parallelism with the side wall of the bore hole, and act as cutting and reaming elements for shaping and smoothing the sides of the bore hole to the desired gauge diameter.

The outer peripheral surface of the cutter is toothed to assist in the reaming action. A lower peripheral groove 37 may be cut in the side of the cutter in such position as to form a sharp cutting edge 9 on the lower face thereof, thus enabling this member to act with greater efficiency in cutting away the material from the bottom of the bore hole. The shafts 21 are carried at their upper ends in bushings 22 that are inserted in cylindrical recesses in the lower enlarged portion 23 of the head, and at their lower ends in bushings 24, that are inserted in the plate 28, which is secured to the lower end of the drill head by heavy stud bolts 29 and dowel pins 30. The plate 28, is also provided with a central bearing to receive the lower end 31 of the extended drill collar 16. The disc cutter members 25 are threaded on the lower ends of their shafts, as previously stated, and are locked in position thereon by means of lead or "Babbitt" metal seals which are cast into the recesses 32 between the square cavities on the lower faces of the disc members, and the flattened undercut ends of the shaft members 26.

The drill collar 16 is provided with a central hole or channel 27; and a pipe 33, extending upwardly into the interior of the drill stem, is threaded into the upper end of this hole. A tubular lubricator cup 34 surrounds the pipe 33 and is threaded on the lower end of the latter. This cup may be closed at the upper end by any suitable cap, not shown. Suitable passageways 35 are provided to conduct the lubricant from the cup 34 to the upper bearing between the member 14 and the drill head 10; and from this bearing the lubricant first flows downwardly into the chamber 19 and thence through the passageways 17 into the upper bearings on the disc shafts 22 and the extension 31 of the rotating drill collar in the plate 28.

The operation of the above described drill structure is as follows: When the drill stem is set in rotation, the movement is first communicated to the member 16 which in turn communicates a positive rotation to the disc members 25, through the medium of the intermeshing cross spur gears 18 and 20. The positive rotation of the members 25— in counter-clockwise direction—causes these members to roll forward, in a clockwise direction, by reason of the frictional engagement of the outmost portion of the lower cutting edges and of the peripheral reaming edges with the material at the bottom and the adjacent side walls of the bore cavity. The drill head 10 and the cutting discs 25, therefore, rotate in the same direction as the drill stem, but at a reduced speed; and the ratio of these differential rotary movements may be varied and controlled, within quite wide limits, by varying the ratio between the diameters of the gears 18 and 20 and the peripheral diameter of the revolving disc members 25.

Fig. 4, which like Fig. 3 is a bottom plan view of the drill bit, illustrates diagrammatically a different embodiment of the construction shown in detail in Figs. 1 and 3. In this modification the disc members 25' are made of a peripheral diameter which is considerably less than the radius of the hole in which the drill is designed to operate; and the lower end 31' of the rotating drill stem member 16 is enlarged and extended downwardly to the level of the cutting edges of the disc members 25'. The lower end of this extension is preferably provided with radially or spirally cut teeth to form an end mill cutter 31' which will act to cut away the disintegrated material at the central portions of the bore hole bottom; and the peripheral faces of this extension may be either provided with teeth, like the disc members 25, or left smooth. In either case, the narrow spaces between the peripheral surfaces of the members 31' and 25' constitute roll passes that will assist in crushing and disintegrating the loose material at the bottom of the cavity and in facilitating its mixture with, and suspension in, the flushing stream of water which is delivered downwardly through the pipe 33 and the opening 27.

This modification also illustrates a variation in the relative sizes of the gears, 18 and 20, as indicated in dotted lines in Fig. 4. Fig. 5 shows diagrammatically another arrangement of the cutters. Three cutters are here shown; and the relative sizes of the cutters and of the portion 31 of the drill collar are varied to produce a slower positive rotation of the cutting members.

In Figs. 6 and 7 I have indicated another construction in which the drill collar 16 and the gears 18 and 20 have been omitted. In this construction the shafts 26" are made integral with the boss 23" of the head and the cutters are made rotatable thereon. The cutter shafts 26" have a central upwardly extending flange 38 on which a split bearing member 35 is fitted. The cutter 25" is made hollow, in the form of a ring, to fit over the bearing 35 and thereby hold the two split parts of the said bearing in rotatable engagement with the shaft 26". The lower end of the cutter is formed of a detachable plate, having a sharp peripheral edge 9"; the said plate being held in position by attaching screws 36 passing through said plate and threaded into segments of the bearing member 35. This lower detachable plate, which is provided with the beveled edge 9", serves to shear away the material from the bottom of the bore hole; and it is obvious that when the sharp shearing edge thereon becomes dulled in operation, the plate may be removed and a new one substituted therefor without disarranging the other parts of the mechanism. In this form of construction the rotation of the head, in the usual clock-wise direction, will engage the outer periphery of the cutter 25" with the side of the hole and cause the said cutter to revolve on its own axis in a counter-clockwise direction. These combined movements will impart a conjoint rolling, shearing, and grinding motion to the cutting members, and cause them to act in a most efficient manner, on the material to be removed from the flat bottom of the hole.

In the constructions above described the drill is centered and steadied in its operation by the engagement between the outer peripheral faces of the horizontal disc members and the adjacent sides of the bore hole; and conversely—in drilling through very soft and unstable formations (such as require "slushing" to prevent caving)—the side walls are prevented from collapsing, and the material forming them is compressed and packed tightly together, by the rolling and smoothing action of the vertical peripheral faces of the said members. This advantage is one that is peculiarly characteristic and typical of the horizontal disc drill type of construction herein disclosed; and in referring to this type I use the term "horizontal disc" to indicate in general a revolving cutting-crushing member of substantial thickness or axial length which is so shaped and positioned as to present an outer peripheral face that is substantially parallel to the axis of rotation of the drill head on which this disc member is mounted; and which is, therefore, substantially parallel to the side wall of the bore hole cut by the drill members. In general, such disc members will revolve on axes that are nearly parallel to the axis of rotation of the drill; and in this sense the "horizontal" disc axes are substantially vertical—in vertical drilling—or are substantially parallel with the drill head axis.

The particular advantage to be obtained from the embodiment, shown in Figs. 1 to 3 inclusive, is that a positive rotation is given to the cutting-crushing discs 25 thereby avoiding any liability of the cutters to become clogged or "balled up" and stuck in the hole. The rotation of the drill stem being imparted, through the gears, directly to the cutters, will cause the latter to rotate at all times; and such rotation will serve to keep the cutters always in effective action and freed from any accumulation of disintegrated material.

Having thus described my invention, the operation and advantages of which will now be obvious to those skilled in the art, what I claim as new and desire to protect by Letters Patent is:

1. In a rotary drill bit, the combination of a head, and two disc-shaped members inclined slightly from the horizontal and rotatably mounted on the end thereof; each of the said members having a peripheral reaming surface, a lower milling and grinding face, and a peripheral groove on the reaming surface adjacent to the lower milling face to provide a sharp shearing edge at the end of the said member.

2. In a rotary drill bit, a disc-shaped cutter inclined but slightly from the horizontal and having a toothed peripheral surface, whose outer side is substantially parallel to the longitudinal axis of the bit, and an end milling face, the toothed peripheral surface being beveled inwardly adjacent the end face to provide a sharp shearing edge thereon.

3. In a rotary drill, the combination of a drill stem, a drill collar secured thereto, a gear member on said drill collar, a head rotatably mounted thereon, disc cutter members rotatably mounted on the lower end of said head, and gear members attached to said discs and in engagement with the gear on the drill stem collar, said head being rotated by the rolling of said cutter on the walls of the hole, substantially as described.

4. In a rotary well drill, the combination of a head, a drill collar rotatably mounted therein, a gear member on said collar, nearly horizontal cutting discs mounted on upright axes journalled in said head, and gears secured to the said axes and adapted to engage with the first mentioned gear and thereby impart a positive synchronous rotative movement to the cutting discs when the drill collar revolves.

5. In a rotary drill, the combination of a drill stem, a drill collar attached thereto, a gear on said collar, a head rotatably mounted thereon, pins journalled in the said head, gears on the said pins engaged by the collar gear, and disc members fixed on the lower ends of the said pins and adapted to make cutting engagement with the sides and bottom of the bore hole, whereby said head is rotated.

6. In a rotary drill, the combination of a drill stem, a collar provided with a spur gear, a drill head capable of rotation with respect to the said collar, disc cutters rotatably mounted at the end of the said head, and gears secured to the said disc cutters and engaging with the collar gear, the rotation of said cutters acting to rotate said head.

7. In a rotary drill, the combination of a drill stem, a gear collar at the lower end thereof, a drill head capable of rotation with respect to the said collar, disc-shaped cutters mounted on the said head on axes inclined slightly from its longitudinal axis, and gears on the said axes engaging with the gear on the said collar whereby the disc cutters and the head are caused to revolve.

8. In a rotary boring drill, the combination of a rotatable drill collar, a drill head mounted for rotation with respect to said collar, cutters journalled on the said head on axes nearly parallel to the longitudinal axis of the head, and intermeshing gears secured to the said collar and the said cutter axes whereby the cutters are caused to revolve synchronously when the drill head is rotated.

9. In a rotary boring drill, the combination of a drill collar, a gear secured thereon, a drill head enclosing the said collar and capable of rotation with respect thereto, cutting discs rotatably mounted on the head and acting to rotate the same, and gears secured to the said discs and engaging with the said collar gear whereby the cutters are caused to rotate simultaneously in the direction opposite to that of the collar.

10. In a rotary boring drill, the combination of a drill collar provided with a toothed end to cut away the center of the hole, a gear secured to the said collar, a head rotatable around said collar, cutters revolvably mounted on the said head, and gears secured to the said cutters and engaging with the said collar gear to secure a synchronous rotation of the said cutters and the toothed end collar.

11. In a rotary boring drill, the combination of a drill collar having its lower end toothed to cut away the center of the hole and provided with a central passage for the flushing water, a head rotatable about said collar, nearly horizontal disc cutters rotatably mounted on said head, and means to positively gear the said cutters to the said collar.

12. In a rotary drill, the combination of a drill stem, a gear collar at the lower end thereof, a drill head capable of rotation with respect to said collar, cutters on the forward end of said head, a gear connection between said collar and said cutters, the rotation of said cutters adapted to act on the work and also to rotate said head.

13. In a rotary drill, a head, cutters on the forward end thereof, means to positively rotate said cutters, the rotation of said cutters acting to rotate said head.

In testimony whereof, I hereunto affix my signature this the 9th day of April 1920.

FRANK L. O. WADSWORTH.